(12) United States Patent
Sailer

(10) Patent No.: US 10,187,502 B2
(45) Date of Patent: Jan. 22, 2019

(54) DEVICE ARRANGEMENT

(71) Applicant: ECOM Instruments GmbH, Assamstadt (DE)

(72) Inventor: Axel Sailer, Weikersheim (DE)

(73) Assignee: Ecom Instruments GmbH (DE)

( * ) Notice: Subject to any disclaimer, the term of this patent is extended or adjusted under 35 U.S.C. 154(b) by 59 days.

(21) Appl. No.: 14/672,074

(22) Filed: Mar. 27, 2015

(65) Prior Publication Data
US 2015/0281416 A1    Oct. 1, 2015

(30) Foreign Application Priority Data

Mar. 28, 2014    (DE) .................. 10 2014 205 887

(51) Int. Cl.
| | |
|---|---|
| *H04W 88/02* | (2009.01) |
| *H04M 1/02* | (2006.01) |
| *G06F 1/16* | (2006.01) |
| *G06F 1/18* | (2006.01) |
| *G06F 1/20* | (2006.01) |

(52) U.S. Cl.
CPC ........ *H04M 1/0266* (2013.01); *G06F 1/1626* (2013.01); *G06F 1/1656* (2013.01); *G06F 1/182* (2013.01); *G06F 1/203* (2013.01); *H04W 88/02* (2013.01); *G06F 2200/1634* (2013.01)

(58) Field of Classification Search
CPC ............................ H04W 88/02; H04M 1/0266
USPC ......................................................... 455/566
See application file for complete search history.

(56) References Cited

U.S. PATENT DOCUMENTS

| | | | | |
|---|---|---|---|---|
| 6,449,887 | B1* | 9/2002 | Song ...................... | A63J 17/00 40/406 |
| 2002/0125816 | A1* | 9/2002 | Dunham ................. | H01J 9/261 313/495 |
| 2003/0147527 | A1* | 8/2003 | Mulligan ............ | H04M 1/0202 379/433.01 |
| 2009/0174687 | A1* | 7/2009 | Ciesla ................. | G06F 3/04886 345/174 |
| 2010/0326636 | A1* | 12/2010 | Eriksen ..................... | G06F 1/20 165/104.33 |
| 2010/0328584 | A1* | 12/2010 | Toyama ................. | C09J 133/08 349/96 |
| 2011/0096025 | A1* | 4/2011 | Slobodin ................. | G06F 3/044 345/174 |
| 2013/0002599 | A1* | 1/2013 | Townsley .............. | G06F 3/0412 345/174 |
| 2013/0271896 | A1* | 10/2013 | Hu ..................... | G02F 1/133308 361/679.01 |

(Continued)

FOREIGN PATENT DOCUMENTS

| | | |
|---|---|---|
| DE | 4114450 A1 | 11/1992 |
| WO | WO-2013/116370 A1 | 8/2013 |

OTHER PUBLICATIONS

English abstract for DE-4114450.
German Search Report for DE102014205887.2, dated Feb. 10, 2015.

*Primary Examiner* — Raj Chakraborty
(74) *Attorney, Agent, or Firm* — Fishman Stewart PLLC

(57) ABSTRACT

A device arrangement may include an electronic device having a display. A cover may be secured on the display. The cover may include a first transparent cover element and a second transparent cover element. A transparent liquid may be disposed in a sandwich-like manner between the first cover element and the second cover element.

20 Claims, 1 Drawing Sheet

(56) References Cited

U.S. PATENT DOCUMENTS

| | | | | |
|---|---|---|---|---|
| 2014/0087197 A1* | 3/2014 | Weber | ............... | G02B 1/105 |
| | | | | 428/432 |
| 2014/0092041 A1* | 4/2014 | Ih | ....................... | G06F 3/044 |
| | | | | 345/173 |
| 2014/0128131 A1* | 5/2014 | Sin | .................. | H04M 1/185 |
| | | | | 455/575.8 |

* cited by examiner

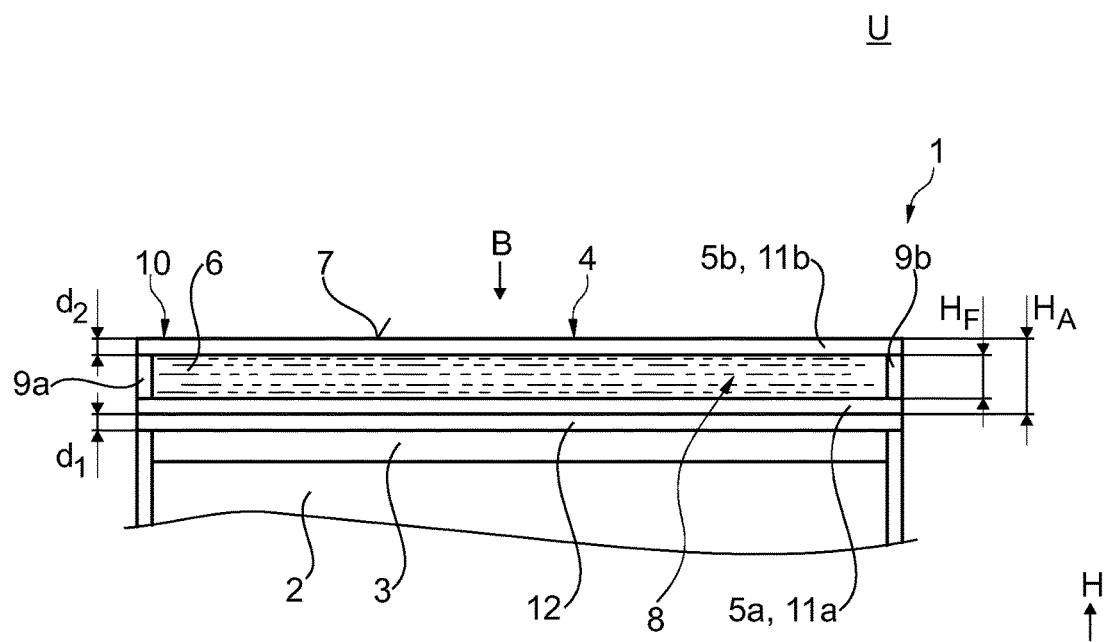

DEVICE ARRANGEMENT

CROSS-REFERENCE TO RELATED APPLICATIONS

This application claims priority to German Patent Application No. 10 2014 205 887.2, filed Mar. 28, 2014, the contents of which are hereby incorporated by reference in their entirety.

TECHNICAL FIELD

The invention relates to a device arrangement.

BACKGROUND

Modern computers are being increasingly manufactured in the form of so-called tablet computers—also known in a simplified manner in technical circles as "tablets". Such a tablet comprises a portable computer with flat geometry which has a touch-sensitive display configured in the form of a touchscreen. The display of the tablet is used at the same time as an input unit, which makes the provision of a keypad or a mouse superfluous. The latest generation of tablets resembles the modern smartphone in terms of their specification.

As a result of their simple handling, tablet computers are also being increasingly used in explosion-prone areas such as, for example, oil drilling platforms or similar as a working device. For any electronic device which are used in such explosion-prone areas, inter alia requirements defined in the DIN standard EN 60079-0 apply with regard to the absolutely necessary mechanical strength of the device. However, the displays of conventional commercially available tablet PCs specifically do not meet the minimum requirements specified in this standard. Furthermore, the temperatures on the surface of the display which are achieved by the display due to faults and which can reach values up to 200° C. prove to be problematical during operation of tablet displays in explosion-prone areas. At such high temperatures however, there is the risk that a gas-air mixture present in the explosion-prone area will be ignited and explode.

One possibility for increasing the mechanical strength of the display of a tablet now consists in applying an additional transparent glass pane having high glass hardness to the surface thereof, whereby an improvement in the mechanical strength of the display can be achieved. However, the detection of a touching of the display by the user, which is absolutely essential in a touchscreen, proves problematical in connection with such an additional glass pane. In conventional tablets this is typically accomplished by means of surface-capacitive signal detection. If an additional glass pane is not applied to the actual display, there is the risk that the required signal coupling between the user when he touches the display or the glass pane applied thereon, and the electronic device is no longer ensured with sufficient accuracy. Another critical aspect when using an additional glass pane is the removal of the waste heat generated by the display.

SUMMARY

It is therefore the object of the present invention to provide an improved embodiment of a device arrangement comprising an electronic device, which is suitable for use in said explosion-prone areas and in which the aforesaid problem no longer arises.

This object is solved by a device arrangement according to the independent claims. Preferred embodiments are the subject matter of the dependent patent claims.

The basic idea of the invention is accordingly to fit an electronic device having a display, in particular a tablet computer, with a transparent cover fastened on the display, where a transparent liquid is provided inside the cover. With a suitable choice of material of the cover, such as possibly toughened glass, such a transparent cover on the one hand brings about the desired increase in the mechanical strength of the entire display of the electronic device.

On the other hand, as a result of the provision of an additional cover, the occurrence of local zones having high surface temperature on the display surface is avoided since the cover according to the invention brings about a homogenized temperature distribution whereby local temperature peaks as a result of defect states occurring in the device, which are critical for use in an explosion-prone area can be avoided.

For this purpose, the liquid contained in the cover is used to remove the waste heat produced by the display, where the physical effect of natural convention is utilized: the portion of the liquid located close to the display absorbs the waste heat emitted by the display which leads to an increase in temperature and density of the liquid in this area. Consequently this results in gravity circulation of the coolant, i.e. in the gravitational field the heated coolant experiences an uplift contrary to the force of gravity, i.e. towards an area of lower heating. In the upper region of the cover, i.e. in a zone facing away from the display, the liquid can then release the previously absorbed heat to the outside again, into the surroundings, where it is cooled again and consequently sinks into the region close to the display due to the force of gravity. There it can again absorb waste heat from the display in the course of a renewed circulation cycle. The previously explained effect of natural convention is also known to the relevant person skilled in the art as thermosiphon cooling.

A device arrangement according to the invention comprises an electronic device having a display, in particular a tablet computer, having a transparent cover which is fastened on the display. The term "transparent" in this case is intended to cover in particular all materials which at least partially transmit light which is visible to the human eye. The cover of the device arrangement comprises a first and a second transparent cover element each in the said sense, where a likewise transparent liquid is disposed in a sandwich-like manner between the two cover elements.

According to an advantageous further development, it is proposed to configure the first cover element as a first cover plate and the second cover element as a second cover plate. A plate-like configuration allows the cover to be provided with a low cover height which is advantageous in connection with a tablet computer.

A particularly effective heat removal of the waste heat generated by the display via the liquid circulating in the casing and via the casing itself can be achieved if the two cover plates as part of the casing are completed by further cover plates to form the complete casing. Against this background it is proposed to provide, in addition to the first and second cover plate, two longitudinal and two transverse plates, which complete the two cover plates to form the casing. The various plates may in this case be manufactured separately and then joined to one another by means of adhesive bonding. Alternatively however, it is also feasible to manufacture two or more of the individual plates in one piece. For the longitudinal and transverse plates a plastic or another suitable material having high thermal conductivity, such as for example, a ceramic is considered as casing material.

A particularly good capacitive coupling of the first cover plate to the display is achieved if the liquid in the casing has the lowest possible liquid height. If a direction running orthogonally to the two cover plates is defined as height direction, it is thus proposed to limit the amount of liquid disposed in the casing in such a manner that the liquid in relation to this height direction has a maximum height of 2 mm, preferably a maximum height of 1 mm.

Also the smallest possible plate thickness of the two cover plates favours said capacitive coupling and thus ensures the touchscreen functionality of the entire display. Thus, in an advantageous further development of the invention it is proposed that the first cover plate is provided with a first plate thickness which is between 0.1 mm and 2 mm, preferably between 0.5 mm and 1.5 mm, most preferably between 0.5 mm and 1 mm. Accordingly alternatively or additionally it is found to be advantageous if the second cover plate has a second plate thickness which is between 0.1 mm and 2 mm, preferably between 0.5 mm and 1.5 mm, most preferably between 0.5 mm and 1 mm.

Furthermore, a suitably high liquid dielectric constant of the transparent liquid disposed in the casing also promotes the touchscreen functionality of the display. A value for the liquid dielectric constant of said liquid of at least 40, preferably of at least 30, most preferably of at least 20 is therefore found to be particularly expedient.

A particularly good thermal coupling of the display to the cover and therefore a particularly effective cooling of the display can be achieved by fastening the first cover element to the display by means of an adhesive connection. In this case, in particular acrylate can be used as adhesive, which on the one hand has a suitably high dielectric constant so that the capacitive properties of the entire touchscreen are preserved but on the other hand has a high thermal conductivity of approximately 0.2 W/mK so that a high heat flow density from the display to the cover and consequently an effective removal of the waste heated generated by the display can be achieved.

An embodiment in which the adhesive connection is configured as an adhesive layer of a transparent adhesive may be deemed to be particularly preferred.

According to an advantageous further development, the adhesive can have an adhesive dielectric constant of at least 4, preferably of at least 10. The highest possible adhesive dielectric constant ensures that the material of the adhesive does not reduce the required capacitive coupling of the cover to the display of the electronic device in an undesirable manner.

Finally, in a further preferred embodiment the first cover element can have a first cover element dielectric constant of at least 4, preferably of at least 7. Alternatively or additionally, the second cover element can also have a second cover element dielectric constant of at least 4, preferably of at least 7.

A particularly good touchscreen functionality is achieved however if the liquid dielectric constant is higher than the first cover dielectric constant and furthermore is higher than the adhesive dielectric constant.

According to a further preferred embodiment, glycerine is proposed as material for the transparent liquid introduced into the casing, which has a liquid dielectric constant of approximately 40. This value can vary in a temperature-dependent manner. According to this embodiment, acrylate is proposed as material for the adhesive, whereas the two cover elements, likewise alternatively or additionally, are made from an, in particular toughened, glass or a transparent ceramic or a combination of the two.

A mechanically particularly high strength in the casing is achieved in an advantageous further development if the glass of the cover elements has a glass hardness of at least 600 HV-02/20, preferably of at least 680 HV-02/20, most preferably of at least 780 HV-02/20, where "HV" designates the Vickers hardness of the glass.

Further important features and advantages of the invention are obtained from the subclaims, from the drawings and from the appurtenant description of the figures by reference to the drawings.

It is understood that the features specified hereinbefore and to be explained hereinafter can be used not only in the respectively given combination but also in other combinations or alone without departing from the framework of the present invention.

BRIEF DESCRIPTION OF THE DRAWINGS

Preferred exemplary embodiments of the invention are shown in the drawings and are explained in detail in the following description.

FIG. 1 illustrates a schematic longitudinal section of an exemplary device arrangement.

DETAILED DESCRIPTION

The single FIG. 1 illustrates in rough schematic view a device arrangement 1 according to the invention comprising an electronic device 2 in the manner of a tablet computer, having a display 3. A cover 4 is fastened to the display, which cover comprises a first and a second, in each case transparent, cover element 5a, 5b. A transparent liquid 6 is disposed between the two cover elements 5a, 5b in a sandwich-like manner.

As can be seen in FIG. 1, the two cover elements 5a, 5b are each configured as cover plates 11a, 11b made of toughened glass or a transparent ceramic—optionally also made of a combination of both. The glass hardness of the glass is in this case at least 600 HV-02/20. The configuration in plate form shown in the example scenario enables the cover 4 to be provided with a low cover height $H_A$ which is advantageous for operation together with a tablet computer. The two cover plates 11a, 11b are completed by two further longitudinal plates and two further transverse plates—in FIG. 2 only the two transverse plates 9a, 9b are shown—to form a casing 11. The casing 10 thus encases a cavity 8 which is filled with a transparent liquid 6. The liquid 6 contained in the cavity 8 of the cover 4 or the casing 10 is used to remove the waste heat generated by the display 3 into the surroundings U of the device arrangement 1. As already discussed initially, the physical effect of natural convection is used for this purpose.

The various plates 11a, 11b, 9a, 9b can be manufactured separately and then—after filling the cavity 8 with the transparent liquid 6, for example joined together by means of adhesive bonding. In this case, possibly a plastic or a ceramic is considered as material for the longitudinal or transverse plates 9a, 9b. The first cover element 5a in the form of a cover plate 9a is fixed on the display 3 by means of an adhesive connection in the form of a transparent adhesive layer 12. In this case, acrylate which has a dielectric constant of approximately 4 is used as adhesive.

The cover 4 shown here, which is transparent in the viewing direction B onto the display 3 on the one hand effects an increase in the mechanical strength of the entire display 3 and therefore of the electronic device 1. On the other hand as a result of the provision of the cover 4 with the two cover elements 5a, 5b and the liquid 6, the occurrence of local zones having high surface temperature on the surface of the display 3 or on a surface 7 of the first cover element 5a is avoided. In particular, the occurrence of temperature peaks in the immediate vicinity of the display 3, which are caused by defects and which are highly critical in an explosion-prone area can in this way be largely or even completely eliminated.

A particularly good capacitive coupling of the second cover plate 9b with the display 3 is achieved if the liquid 6 also has the lowest possible liquid height $H_F$. Against this background FIG. 1 shows a height direction H running orthogonally to the two cover plates 11a, 11b, in relation to which the liquid 6 located in the casing 10 has a maximum liquid height $H_F$ of 1 mm.

The liquid 6 provided in the cover 4 comprises, in the example scenario, glycerine which has a liquid dielectric constant of about 40. In variants however, naturally other transparent liquids 6 having correspondingly varying liquid dielectric constants can also be used. Furthermore, the first cover element 5a has a first cover element dielectric constant of at least 4, preferably of at least 7. Accordingly the second cover element 5b has a second cover element dielectric constant of at least 4, preferably of at least 7.

Also the smallest possible plate thickness $d_1$, $d_2$ of the two cover plates 11a, 11b promotes an effective capacitive coupling of the cover 4 with the display 3 and consequently ensures the touchscreen functionality of the display 3. The first cover plate 11a therefore in the example has a first plate thickness $d_1$, which is between 0.1 mm and 2 mm, preferably between 0.5 mm and 1.5 mm, most preferably between 0.5 mm and 1 mm. Accordingly the second cover plate 11b has a second plate thickness $d_2$ which is between 0.1 mm and 2 mm, preferably between 0.5 mm and 1.5 mm, most preferably between 0.5 mm and 1 mm.

The invention claimed is:

1. A device arrangement, comprising:
a computer having a display with an outer surface;
a cover secured on the display, the cover including a transparent first cover plate overlaying the outer surface of the display, a transparent second cover plate arranged over the first cover plate with respect to the display and separated from the first cover plate by a cavity, and a transparent liquid disposed in a sandwich-like manner between the first cover plate and the second cover plate, wherein the first cover plate and the second cover plate are structured and arranged to extend over an entire extent of the display with the cavity disposed therebetween, and the transparent liquid is filled throughout the cavity to provide a transparent view in a viewing direction through the cover onto the display;
wherein the first cover plate and the second cover plate define at least part of a casing, the casing further including two transverse plates and two longitudinal plates coupled to the first cover plate and the second cover plate, said two transverse plates and said two longitudinal plates disposed along a periphery of the display with respect to the viewing direction and surround the cavity between the first cover plate and the second cover plate; and
wherein the casing encloses the cavity filled with the transparent liquid such that the transparent liquid is distributed along the outer surface throughout the extent of the display.

2. The device arrangement according to claim 1, wherein the first cover plate and the second cover plate are arranged spaced apart from one another in a direction running orthogonally to the display to provide the transparent view in the viewing direction through the cavity filled with the transparent liquid onto the display.

3. The device arrangement according to claim 1, wherein the cavity delimits a height of the liquid in a height direction running orthogonally to the first cover plate and the second cover plate; and
wherein the height of the liquid is 2 mm or less in relation to the height direction.

4. The device arrangement according to claim 1, wherein at least one of:
the first cover plate includes a first plate thickness between 0.1 mm and 2 mm; and
the second cover plate includes a second plate thickness between 0.1 mm and 2 mm.

5. The device arrangement according to claim 1, wherein the transparent liquid has a liquid dielectric constant of at least 40.

6. The device arrangement according to claim 1, wherein the first cover plate is fixed on the outer surface of the display via an adhesive connection.

7. The device arrangement according to claim 6, wherein the adhesive connection includes an adhesive layer composed of a transparent adhesive.

8. The device arrangement according to claim 7, wherein the adhesive layer has an adhesive dielectric constant of at least 4.

9. The device arrangement according to claim 1, wherein at least one of:
the first cover plate has a first cover plate dielectric constant of at least 4; and
the second cover plate has a second cover plate dielectric constant of at least 4.

10. The device arrangement according to claim 9, wherein the first cover plate is fixed on the outer surface of the display via an adhesive connection, the adhesive connection including an adhesive having an adhesive dielectric constant, wherein the liquid has a liquid dielectric constant higher than the first cover plate dielectric constant and the adhesive dielectric constant.

11. The device arrangement according to claim 1, wherein at least one of the first cover plate and the second cover plate is composed of at least one of a toughened glass and a transparent ceramic.

12. The device arrangement according to claim 11, wherein the glass of the at least one of the first cover plate and the second cover plate has a glass hardness of at least 600 HV-02/20.

13. The device arrangement according to claim 1, wherein the transparent liquid is composed of glycerine.

14. The device arrangement according to claim 1, wherein the transparent liquid is composed of a transparent material having a liquid dielectric constant of at least 20 filled sufficiently throughout the cavity to maintain a capacitive coupling of the cover to the display via the first cover plate, the second cover plate, and the transparent material.

15. The device arrangement according to claim 1, wherein at least one of the computer is a portable computer and the display is a touchscreen.

16. A device arrangement, comprising:
a touch-sensitive display of an electronic device;
a casing secured on the touch-sensitive display and enclosing a cavity, the casing including a first transparent cover plate fixed on an outer surface of the touch-sensitive display, a second transparent cover plate spaced apart from the first transparent cover plate in a direction away from the touch-sensitive display to define the cavity therebetween, and a plurality of side plates disposed between the first transparent cover plate and the second transparent cover plate, the plurality of side plates structured and arranged to extend along a perimeter of the touch-sensitive display and surround the cavity;
a transparent liquid disposed in the cavity sandwiched between the first transparent cover plate and the second transparent cover plate with respect to a viewing direction through the casing onto the touch-sensitive display;
wherein the first transparent cover plate and the second transparent cover plate are structured and arranged to extend over an entire extent of the touch-sensitive display with the transparent liquid disposed therebetween relative to the viewing direction;
wherein the transparent liquid is composed of a transparent material filled sufficiently throughout the cavity to maintain a capacitive coupling of the casing to the touch-sensitive display and such that the casing is transparent in the viewing direction through the cavity filled with the transparent liquid onto the touch-sensitive display; and
wherein the transparent liquid has a liquid dielectric constant greater than a dielectric constant of at least one of the first transparent cover plate and the second transparent cover plate to facilitate the capacitive coupling.

17. The device arrangement according to claim 16, wherein the transparent material of the transparent liquid is glycerine.

18. The device arrangement according to claim 16, wherein the first transparent cover plate and the second transparent cover plate are composed of at least one of a transparent toughened glass and a transparent ceramic, and wherein the plurality of side plates are composed of a plastic material or a ceramic material.

19. The device arrangement according to claim 16, wherein the first transparent cover plate is fixed on the outer surface of the touch-sensitive display via a transparent adhesive to secure the casing to the touch-sensitive display.

20. The device arrangement according to claim 16, wherein at least one of the first transparent cover plate and the second transparent cover plate has a plate thickness of plate thickness of 0.1 mm to 2 mm.

* * * * *